Nov. 30, 1943.  C. E. KERR  2,335,594
FEED ROLL FOR CORN CUTTERS
Filed Aug. 11, 1941

Inventor
CHARLES E. KERR
By Philip G. Minnis
Attorney

Patented Nov. 30, 1943

2,335,594

UNITED STATES PATENT OFFICE 2,335,594

FEED ROLL FOR CORN CUTTERS

Charles E. Kerr, Hoopeston, Ill., assignor to Food Machinery Corporation, San Jose, Calif., a corporation of Delaware Application August 11, 1941, Serial No. 406,297

9 Claims. (Cl. 130—9)

This invention relates to machines for cutting green corn from the cob.

The principal object of the invention is to provide an improved feed roll construction for use in a corn cutter.

The invention is particularly applicable in machines of the type wherein the ears of corn are fed in succession through a cutting head equipped with revolving knives which cut the kernels from the cob as the ear is fed axially through the head. Accordingly, it is another and more specific object of the invention to provide a feed roll construction which will align the ear with the axis of the cutting head as it feeds the ear therealong and which at the same time will prevent rotation of the ear on its own axis, such rotation tending to occur as a result of the revolving knives engaging the ear.

Other objects of the invention will become apparent after the following disclosure of an embodiment of the invention.

The feed rolls of my invention are herein shown as employed in a corn cutter such as that disclosed in the patent to Schmidt, No. 2,034,993, issued March 24, 1936, to which reference is to be had for a disclosure of the entire machine.

Figure 1:
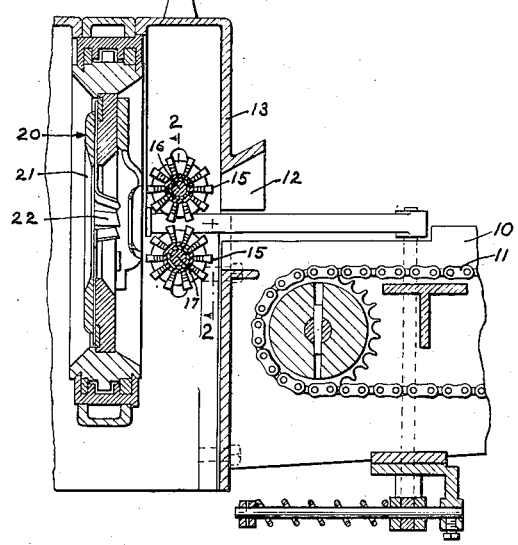
Fig. 1 is a vertical transverse section through a pair of the improved feed rolls as they appear in their immediate environment in a corn cutter.

As shown in Fig. 1 of the drawing, the machine has a feed trough 10 in which is disposed an endless chain 11 for conveying the ears of corn successively to an aperture 12 through which they enter the housing 13. Within the entrance of the housing is disposed a pair of the feed rolls 15 of my invention. The rolls are mounted on feed roll shafts 16, 17 which, as disclosed in the above-mentioned patent, are rotated in opposite directions and are resiliently urged toward each other to maintain the rolls in engagement with the ear. The rolls 15 feed the ear into a cutting head 20 which is mounted in the housing 13. An annular member 21 is rotatably supported in the head 20 and is rotated by suitable gearing not shown. The rotary member 21 carries a plurality of knives 22 which operate in a well-known manner to cut the kernels from the cob.

Figure 2:
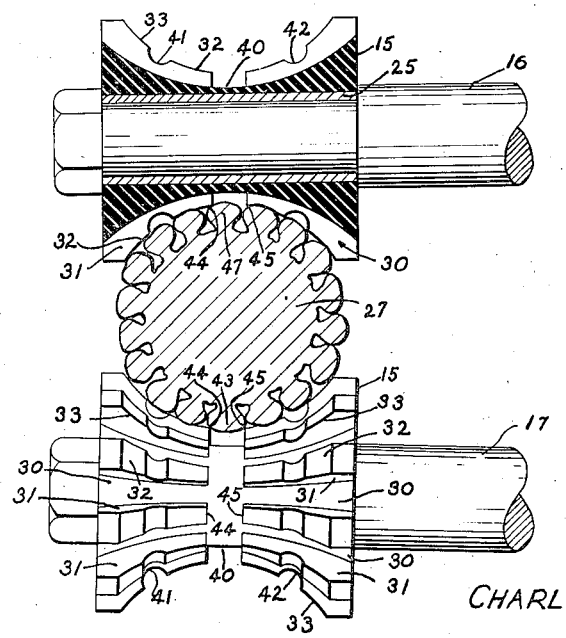
Fig. 2 is an enlarged view of the rolls, taken as indicated by the section line 2—2 in Fig. 1, illustrating the manner in which an ear of corn is disposed between the rolls.

The feed rolls 15 are identical in construction. Each roll comprises a metal bushing 25 on which a soft rubber roll is bonded. The body of the roll is spool-shaped to provide a bearing surface approximately the contour of the ear of corn. The two rolls cooperate, as shown in Fig. 2, to center the ear of corn 27 between them and thus maintain the ear in alignment with the axis of the rotary cutter 20.

Means are provided in each roll to facilitate the feeding action. This is accomplished by forming arcuate grooves 30 in the body of the roll. These grooves extend longitudinally of the roll and are spaced apart to form ribs 31 therebetween. I prefer to form the grooves 30 so as to leave rather stubby ribs 31 having relatively broad faces 32 for engaging the corn. This construction, I have found, provides a roll which exerts a powerful feeding action on the ear of corn, there being considerable friction between the resilient rubber surfaces 32 and the ear. The feeding action is also improved by grooving the roll because it permits the kernels to engage in the grooves so that they mesh somewhat in the manner of a rack and pinion. This intermeshing does not, however, injure the kernels because the roll is made of soft rubber and the ribs 31 are therefore resilient so that the edges 33 of the ribs may flex more or less to conform to the irregularities in the surface of the ear.

Means are also provided to prevent the ear from rotating while in engagement with the rolls. This is an important feature of the invention. The knives 22 in revolving around the ear to cut the kernels therefrom tend to rotate the ear on its own axis. It will be apparent from an inspection of Fig. 2 that any such rotation would necessitate the ear moving relative to the rolls. On account of the friction between the rubber surfaces 32 and the kernels, there would be danger of the kernels becoming bruised and mashed if the ear rotated in the rolls. This is particularly undesirable in cutting whole grain corn where the cut kernels must be whole and not disfigured to be acceptable for canning.

To prevent the rotary cutter from rotating the ear in the rolls I form a circumferential groove 40 around the middle of the roll. If desired, extra grooves, such as 41 and 42, may be provided. A kernel, such as that shown at 43, tends to lodge in the groove 40 and engage the edges 44, 45 of the groove. As the rolls feed the ear into the cutter the longitudinal row of kernels, in which the kernel 43 is located, tends to stay in the groove 40, thus counteracting the tendency of the ear to rotate. Here again, no harm is done the kernels because the edges 44, 45 may flex somewhat.

Even if the kernel does not entirely fit into the groove it may engage one edge. This condition is illustrated in Fig. 2 where the kernel 47 is shown engaging against the edge 44 which acts as a stop to oppose rotation of the ear. The other grooves 41, 42 have a similar effect, as will be apparent from the drawing, although I prefer to make them shallower than the central groove 40.

I have provided a feed roll construction which exerts a powerful feeding action on the ear of corn without, however, injuring the kernels in any way. This is due to the fact that instead of employing teeth, prongs, sharp edged ribs, or fins which penetrate the ear I rely on surface friction between the soft rubber spool-shaped bearing surface comprising the broad faces 32 and the external surface of the kernels. In order to prevent slippage of the ear in the rolls it is essential that the contacting surface of the roll be relieved by means of longitudinally and circumferentially extending grooves or depressions, for otherwise the ear tends to shift and turn in the rolls with consequent disintegration of the kernels.

Having thus described my invention and in what manner the same may be used, what I claim and desire to protect by Letters Patent is:

1. A feed roll for a rotary whole kernel green corn cutter comprising a spool-shaped body having a plurality of stubby ribs of soft elastic material, such as rubber defined by grooves in the surface of said body, said ribs having substantially flat resilient traction faces at the top thereof for fitting the ears and said faces also having resilient rectilinear kernel engaging edges adjacent said grooves, certain of said edges being adapted to facilitate movement of the ears of corn along the axis of the cutter and others to prevent rotation of the ears relative to the roll.

2. A feed roll for a rotary whole kernel green corn cutter comprising a circular body of elastic material having an arcuate surface for fitting an ear of corn, said surface having a plurality of longitudinally extending elongated, stubby ribs defined by intervening longitudinal grooves, said ribs having substantially flat generally rectangular kernel bearing faces interrupted by transverse grooves in said ribs and said ribs having substantially square resilient kernel engaging edges adjacent said longitudinal and transverse grooves for facilitating movement of the ear of corn along the axis of the cutter while preventing rotation of the ear relative to the roll.

3. In a green corn cutting apparatus, the combination of a rotary cutter for cutting whole kernels from ears of corn and a pair of feed rolls between which ears of corn are fed to said cutter along the axis thereof, said rolls each having a plurality of elongated stubby ribs formed of elastic material and defined by longitudinal and transverse grooves in the surface thereof, said ribs having substantially broad top faces shaped to engage the ears and said faces having resilient rectilinear kernel engaging edges adjacent said longitudinal grooves for facilitating feed of the ears to the cutter and substantially sharp, resilient kernel engaging edges adjacent said transverse grooves for preventing rotation of the ears relative to the roll.

4. In a green corn cutting apparatus, the combination of a rotary cutter for cutting whole kernels from ears of corn and a pair of feed rolls between which ears of corn are fed to said cutter along the axis thereof, said rolls having a surface formed of elastic material such as rubber and comprising a plurality of longitudinally extending, spaced, stubby ribs having substantially broad and flat resilient traction faces at the top thereof and substantially resilient, rectilinear side edges for engaging the kernels to facilitate feed of the ears to the cutter and said ribs being also provided with transversely extending grooves defining substantially sharp resilient, rectilinear transverse edges on said ribs for engaging the kernels to prevent rotation of the ears relative to the roll.

5. In a green corn cutter having rotary cutting means for cutting whole kernels from ears of corn, means including a spool-shaped roll to feed the ear toward said cutting means along the axis of rotation thereof, said roll having its surface provided with a series of longitudinally extending spaced thick ribs formed of elastic material and having broad, substantially flat resilient traction faces on their tops and substantially sharp resilient rectilinear side edges to facilitate feeding the ears, and said roll also having a circumferential groove formed therein and intersecting said ribs to provide substantially sharp rectilinear transverse edges on the said ribs for engagement with the kernels to prevent rotation of the ears relative to said roll.

6. In a green corn cutter having rotary cutting means for cutting whole kernels from ears of corn, a pair of spool-shaped feed rolls for feeding the ear axially toward said cutting means, each roll having its surface provided with a series of spaced stubby elastic ribs extending longitudinally of the axis of the roll; said ribs having broad, resilient traction faces at the top thereof with substantially sharp longitudinal rectilinear edges to facilitate feeding the ears, and each of said rolls having a circumferential groove around the middle of said roll and intersecting said ribs defining substantially sharp rectilinear transverse edges on said ribs for engagement with the kernels to prevent rotation of the ears relative to said roll.

7. A feed roll for a rotary whole kernel green corn cutter, said roll being constructed of elastic material, such as rubber, and formed in a spool shape to fit an ear of corn, said roll having arcuate grooves formed in the surface thereof and extending longitudinally of the roll, said grooves being spaced apart to leave therebetween stubby ribs having broad substantially flat top faces and substantially sharp longitudinal rectilinear edges for engaging and moving the ears to the cutter, and said roll having a circumferential groove around the middle thereof and intersecting said ribs providing substantially sharp transverse rectilinear edges on said ribs for engaging the kernels to prevent rotation of the ears relative to the roll.

8. A feed roll for a rotary whole kernel green corn cutter, said roll having a spool shape, and provided with a series of longitudinally extending spaced thick ribs formed of elastic material and having broad substantially flat resilient traction faces on their tops which are arcuately arranged to fit the ear and substantially sharp resilient rectilinear side edges to facilitate feeding the ears, and said roll also having a circumferential groove formed therein and intersecting said ribs to provide substantially sharp rectilinear transverse edges on the said ribs for engagement with the kernels to prevent rotation of the ears relative to said roll.

9. In a green corn cutter having rotary cutting means for cutting whole kernels from ears of corn, means including a spool-shaped roll to feed the ears toward said cutting means along the axis of rotation thereof while preventing rotation of the ears relative to the roll, said roll having an ear bearing surface approximately the contour of the ear and formed of elastic material, said surface being relieved by grooves extending longitudinally and circumferentially of said roll providing elongated substantially broad and flat resilient traction faces of generally rectangular shape; said faces having substantially sharp longitudinal and transverse edges for engaging said kernels substantially without injury thereto, the former for facilitating feed of the ears to the cutting means and the latter for preventing rotation of the ears relative to the roll.

CHARLES E. KERR.